Herman F. Thornsbery
INVENTOR.

Nov. 18, 1969   H. F. THORNSBERY   3,478,795
MECHANICAL BROCCOLI CUTTER
Filed Aug. 29, 1968   4 Sheets-Sheet 4
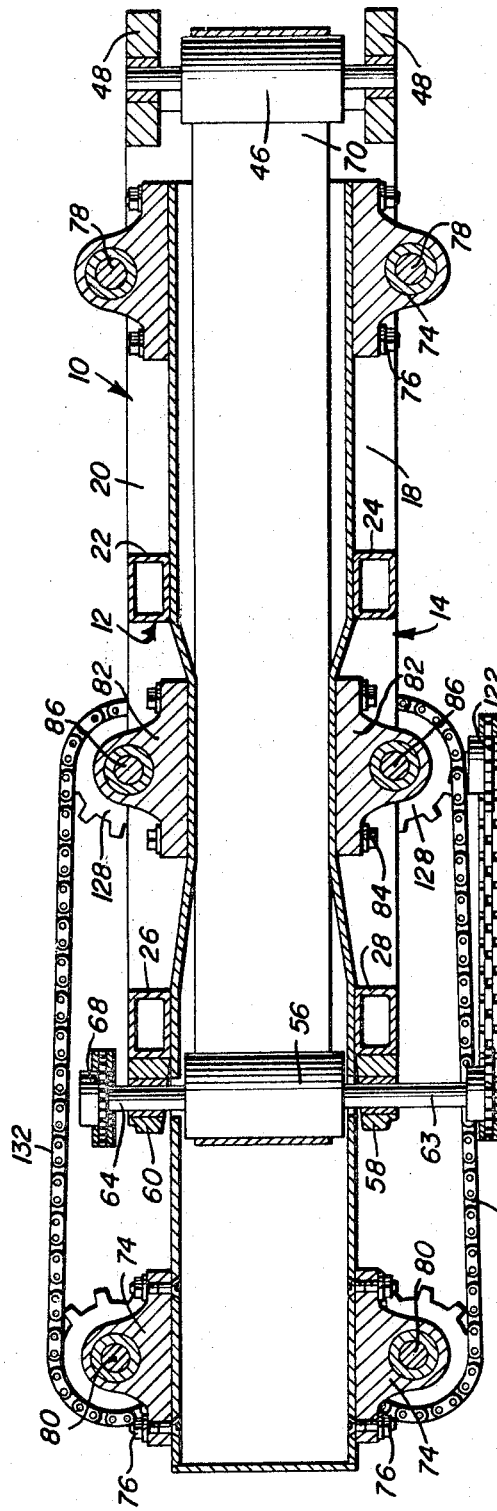
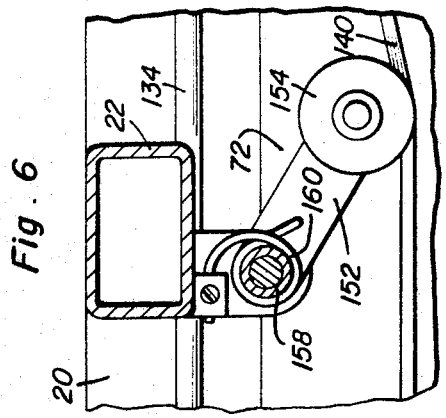
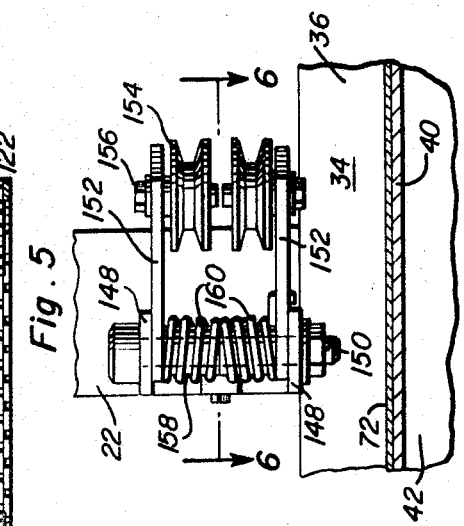
Herman F. Thornsbery
INVENTOR.
BY Clarence A. O'Brien
and Harvey B. Jacobson
Attorneys

United States Patent Office 3,478,795
Patented Nov. 18, 1969

3,478,795
MECHANICAL BROCCOLI CUTTER
Herman F. Thornsbery, c/o T & C Manufacturing Co.,
P.O. Box 1934, 1601 Mono Drive, Modesto, Calif.
95354
Filed Aug. 29, 1968, Ser. No. 756,207
Int. Cl. A23p 1/00; B26d 4/04
U.S. Cl. 146—78                                   9 Claims

ABSTRACT OF THE DISCLOSURE

A generally horizontally disposed conveyor assembly including a horizontal conveyor belt adapted at one end to have broccoli heads placed thereon in head down position and driven at a lineal rate of approximately 100 feet per minute. A plurality of vertically spaced narrow belts are disposed over opposite side portions of the conveyor belt and include corresponding opposing reaches extending along the conveyor belt adapted to embrace the upwardly projecting stalk portions of inverted broccoli heads disposed on the conveyor belt, the mid-portions of the opposing reaches of the narrow belts being yieldably biased toward closely adjacent horizontally aligned positions spaced transversely of the conveyor belt. The narrow belts are driven at a lineal speed approximating the lineal speed of the conveyor belt and a pair of horizontally disposed driven rotary cutter disks are journaled on opposite sides of the conveyor belt and include adjacent peripheral portions disposed in cutting relation with each other spaced approximately five inches above the conveyor belt for cutting the upper ends of the stalks of the broccoli heads from the latter. Also, a vertically disposed driven cutting disk is centered over the conveyor belt and is disposed on the outlet side of the horizontal cutting disks with its lower peripheral portions spaced approximately three above the horizontal conveyor belt for splitting the inverted broccoli heads from above after the base ends of the stalk portions thereof have been removed by the horizontal cutting disks.

The broccoli cutting machine includes means for supporting and rapidly moving inverted broccoli heads past coacting horizontal rotary knives or disks and a vertical rotary knife or disk whereby the two halves of each broccoli head may be easily tri-sected by workers making broccoli spears which will readily fit into the packages in which frozen vegetables are packaged.

In order to perform inspection operations and to insure that the two halves of each broccoli head may be properly tri-sected the tri-secting of broccoli head halves to form broccoli spears is done manually. In this manner, the individual head halves may be visually inspected and properly cut so as to form generally equal spears for packaging. However, the initial task of cutting the base ends of the stalks from the broccoli heads and of splitting the broccoli heads in two from the bottom is rapidly and accurately performed by the cutter of the instant invention and thereby reduces the manual labor necessary to cut a broccoli head from the field into spears ready for packaging.

The main object of this invention is to provide a cutter which will be capable of rapidly cutting the base ends of the stalks of broccoli heads and thereafter splitting the broccoli heads in two from the bottom.

Another object of this invention, in accordance with the immediately preceding object, is to provide a machine whose cutting members may be readily adjusted so as to be adapted to correctly perform the necessary cutting operations on various crops of broccoli heads of different sizes.

Still another object of this invention is to provide a broccoli cutting machine which will handle the broccoli heads to be cut thereby in a manner such that damage of the broccoli heads will be maintained at a minimum.

Still another important object of this invention is to provide a broccoli cutter in accordance with the preceding objects and including cutting components thereof whose cutting edges may be readily sharpened.

Yet another object of this invention is to provide a broccoli cutter including means for supporting the broccoli heads in inverted position and with portions for engaging the stalk portions of the broccoli heads to be cut that will automatically compensate for stalk portions of different sizes.

A final object of this invention to be specifically enumerated herein is to provide a broccoli cutter which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a horizontal sectional view taken substantially upon the plane indicated by the section line 4—4 of FIGURE 1;

FIGURE 5 is a fragmentary longitudinal vertical sectional view on an enlarged scale illustrating one of the assemblies by which corresponding ends of each pair of narrow belts are tensioned and biased toward the longitudinal center of the conveyor belt;

FIGURE 6 is a fragmentary horizontal sectional view taken substantially upon the plane indicated by the section line 6—6 of FIGURE 5; and FIGURE 7 is a fragmentary longitudinal vertical sectional view taken substantially upon the plane indicated by the section line 7—7 of FIGURE 2.

Figure 1:
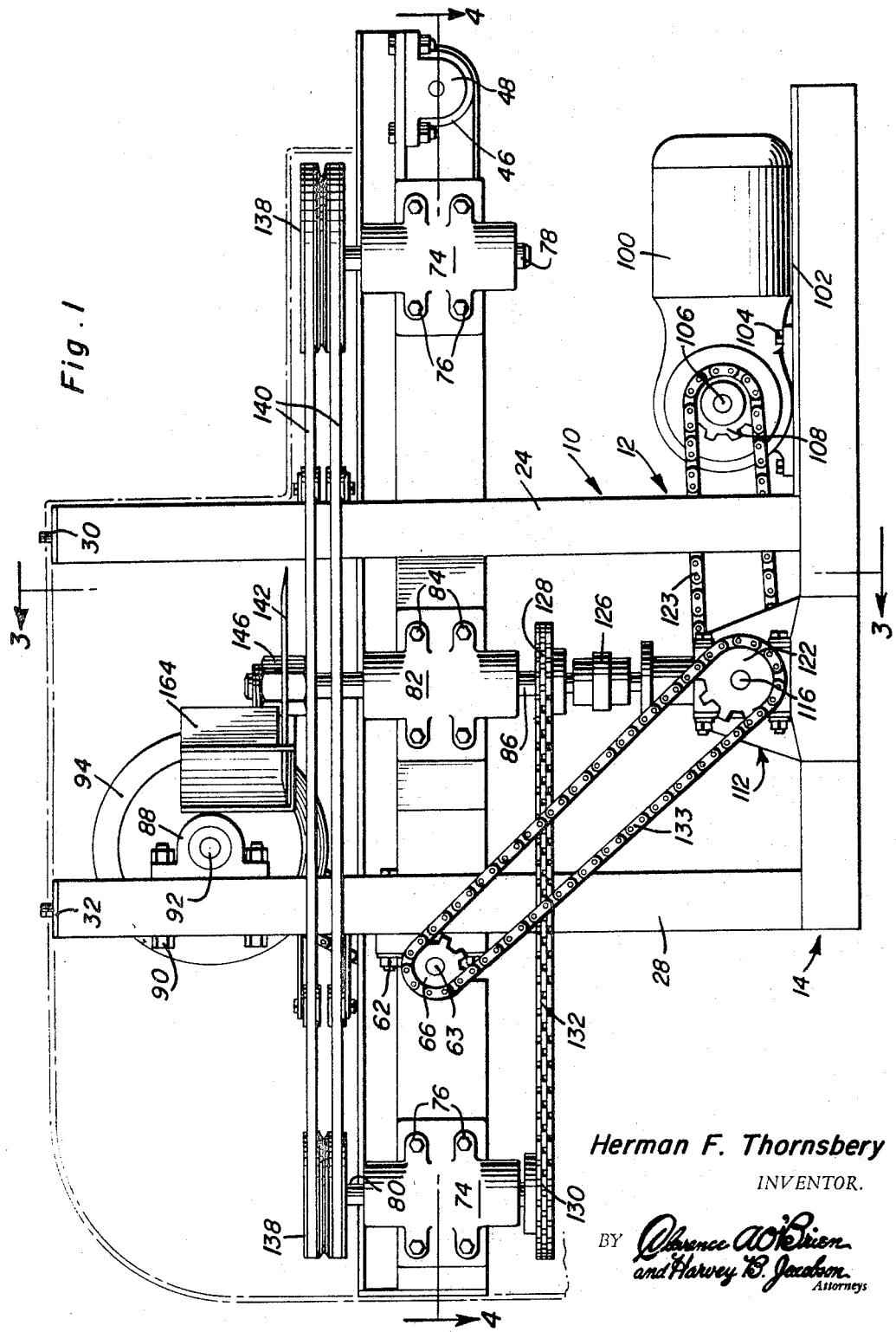
FIGURE 1 is a side elevational view of the broccoli cutter with cover portions thereof illustrated in phantom lines.

Referring now more specifically to the drawings, the numeral 10 generally designates the machine of the instant invention which includes a support stand generally referred to by the reference numeral 12. The support stand 12 includes a base referred to in general by the reference numeral 14 constructed of a pair of opposite side horizontal members 16 and 18 interconnected at their opposite ends by means of transverse members 20. Four uprights 22, 24, 26 and 28 have their lower ends secured to the horizontal members 16 and 18 and project upwardly from the latter. The upper ends of the uprights 22 and 24 are interconnected by means of a transverse member 30 and the upper ends of the uprights 26 and 28 are interconnected by means of a transverse member 32.

A horizontally disposed channel member 34 including opposite side flange portions 36 and 38 interconnected by means of a lower bight portion 40 is provided and extends between the pairs of opposite side uprights 22 and 26 and 24 and 28. The channel member 34 includes a pair of depending flange portions 42 and 44 whose upper marginal edge portions are secured to the bight portion 40 in any convenient manner such as by welding and the channel member 34 is supported between the uprights 22, 24, 26 and 28 in fixed position relative thereto.

A horizontal roller 46 is journaled at the inlet end of the machine 10 by a pair of journal blocks 48 secured to angle members 50 by means of suitable fasteners 52. The angle members 50 are supported from and project outwardly of the corresponding flange portions 36. In addition, a drive roller 56 is supported from the uprights 26 and 28 by means of journal blocks 58 and 60 secured to the uprights 26 and 28 by means of suitable fasteners 62 and the drive roller 56 includes opposite end shaft portions 63 and 64 which extend through the journal blocks 58 and 60 and have sprocket wheels 66 and 68 mounted thereon for rotation therewith.

An endless flexible conveyor belt 70 is trained about the rollers 46 and 56 and the drive roller 56 is driven in a direction to advance the upper reach 72 of the conveyor belt 70 toward the drive roller 56, the upper reach 72 closely overlying and sliding along the upper surface of the bight portion 40 of the channel member 34.

A pair of similar journal blocks 74 are mounted exteriorly of the opposite ends of each of the flange portions 42 and 44 by means of suitable fasteners 76 secured through the journal blocks 74 and horizontally elongated slots (not shown) in the flange portions 42 and 44. A pair of upstanding shafts 78 are journaled through the journal blocks 74 adjacent the journal blocks 48 and a pair of shafts 80 are journaled through the journal blocks 74 adjacent the drive roller 56. In addition, a pair of opposite side journal blocks 82 are mounted exteriorly of the flange portions 42 and 44 intermediate the journal blocks 74 and the drive roller 56 by means of suitable fasteners 84 secured through the journal blocks 82 and through horizontally elongated slots (not shown) formed in the flange portions 42 and 44. A pair of shafts 86 are journaled through the journal blocks 82.

A final pair of journal blocks 88 are secured to the uprights 26 and 28 by means of suitable fasteners 90 secured through the journal blocks 88 and through vertically elongated slots (not shown) formed through the upright members 26 and 28. A horizontal shaft 92 is journaled through the journal blocks 88 and has a circular cutting disk 94 mounted thereon for rotation therewith centrally intermediate its opposite ends. The cutting disk 94 is mounted on a diametrically enlarged and externally threaded portion 96 of the shaft 92 and a pair of nuts 98 are threadedly engaged with the diametrically enlarged portion 96 on opposite sides of the cutting disk 94. Accordingly, the cutting disk 94 may be adjusted within the limits of the diametrically enlarged portion 96 longitudinally of the shaft 92 and thus transversely of the machine 10.

An electric gear head motor 100 is removably supported from a cross plate 102 secured over the ends of the horizontal members 16 and 18 beneath the journal blocks 48 by means of fasteners 104 and the gear head motor includes a transversely extending output shaft 106 upon which a sprocket wheel 108 is mounted. A pair of right angle drive assemblies generally referred to by the reference numerals 110 and 112 are supported from the horizontal members 16 and 18 and include aligned input shafts 114 and 116, respectively, coupled together by means of a coupling member 118 extending between their adjacent ends. The shaft 116 has a sprocket wheel 120 mounted thereon and extends through the drive assembly 112 and has a second sprocket wheel 122 mounted thereon disposed outwardly of the horizontal member 18. An endless drive chain 123 is provided and trained about the sprocket wheels 108 and 120 whereby the gear head motor 110 is drivingly coupled to the shafts 114 and 116.

Each of the drive assemblies 110 and 112 includes an upstanding output shaft 124 and the upper ends of the output shafts 124 are coupled to the lower ends of the shafts 86 by means of flexible coupling assemblies 126. The lower ends of the shafts 86 have sprocket wheels 128 mounted thereon and the lower ends of the shafts 80 have sprocket wheels 130 mounted thereon. A pair of endless drive chains 132 are trained about the pairs of sprocket wheels 128 and 130 disposed on each side of the machine 10 and accordingly, the output shafts 124 are drivingly coupled to the shafts 86 and the shafts 80. Further, an endless drive chain 133 is trained about the sprocket wheels 122 and 66 so as to couple the outer end of the shaft 116 to the shaft portion 63.

The shaft 92 is provided with a sprocket wheel 134 and an endless drive chain 136 is trained about the sprocket wheels 68 and 134. Finally, each of the shafts 78 and 80 has a double flanged pulley wheel 138 mounted thereon above the corresponding journal block 74 and a pair of endless V-belts 140 are trained about the pulleys or pulley wheels 138 disposed on each side of the machine 10. Thus, the shafts 80 disposed adjacent the drive roller 56 are drivingly coupled to the shafts 78 adjacent the roller 46.

A pair of cutting disks 142 are mounted on diametrically enlarged externally threaded portions 144 of the shafts 86 and a pair of nuts 146 are threadedly engaged on each diametrically enlarged portion on opposie sides of the corresponding cutting disk 142. Accordingly, the cutting disks 142 may be adjusted axially of their supporting shafts 86.

Figure 2:
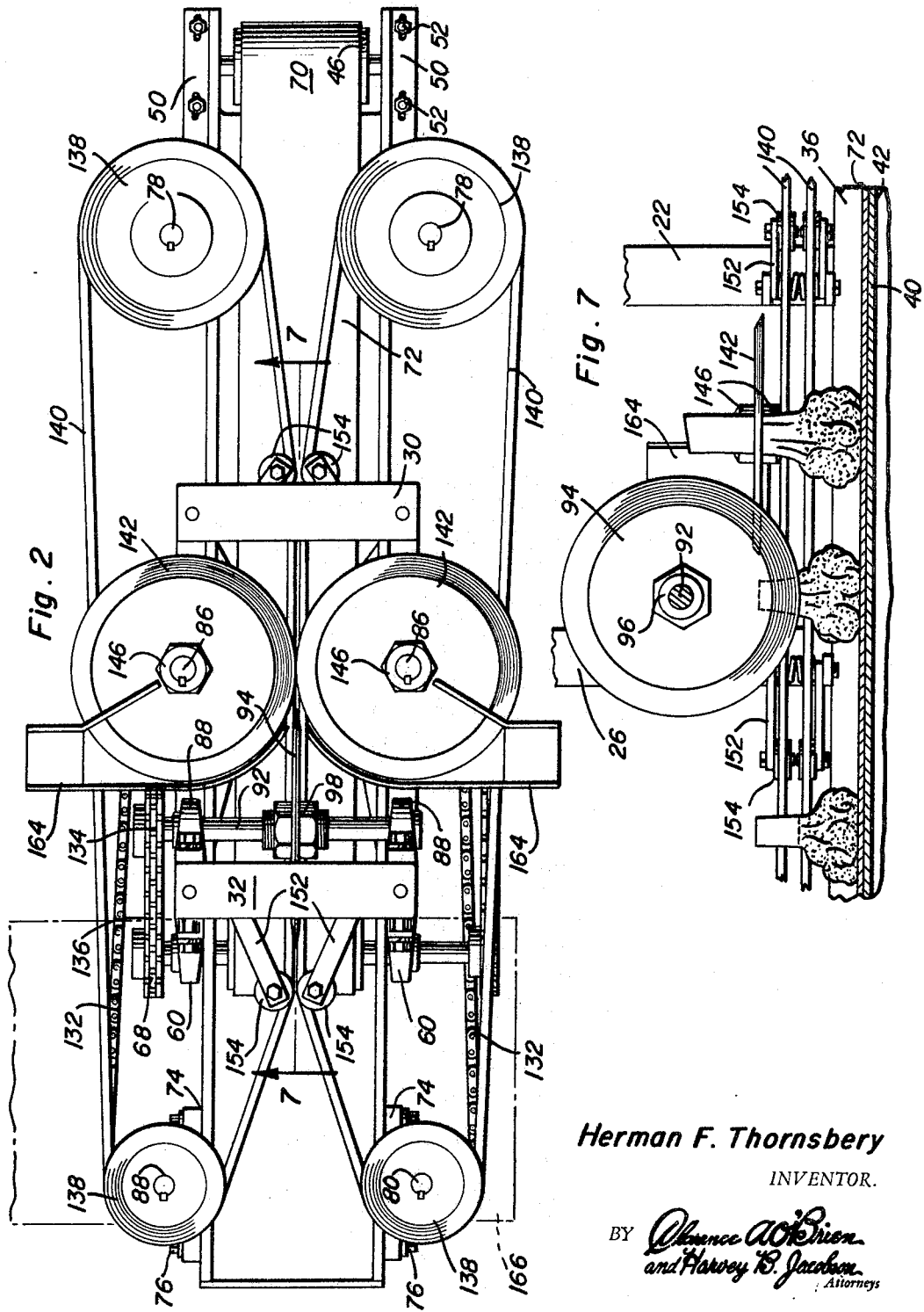
FIGURE 2 is a top plan view of the broccoli cutter.
Figure 3:
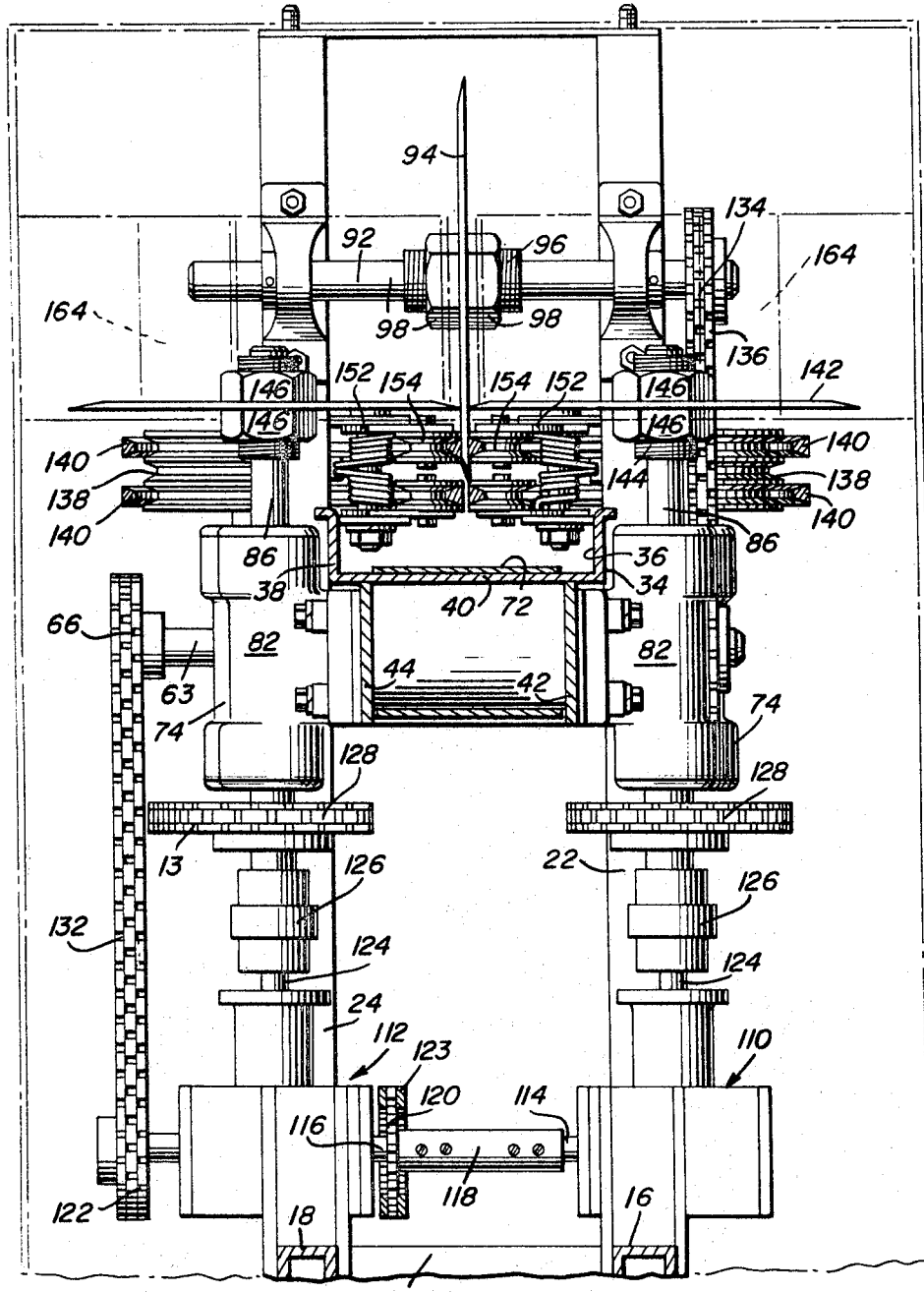
FIGURE 3 is an enlarged fragmentary transverse vertical sectional view taken substantially upon the plane indicated by the section line 3—3 of FIGURE 1.

Vertically spaced pairs of mounting ears 148 project inwardly from each of the uprights 22, 24, 26 and 28 and each pair of mounting ears 148 has a pivot bolt 150 secured therethrough with corresponding ends of a pair of support arms 152 pivotally supported from the pivot fastener 150. The free ends of the support arms 152 have belt tensioning pulleys 154 journaled therefrom by means of pivot fasteners 156 and the base ends of the support arms 152 remote from the pulleys 154 include sleeve portions 158 which are journaled on the corresponding pivot shafts or fasteners 150. A pair of torsion springs 160 are operatively connected between each pair of support arms 152 in the corresponding upright so as to yieldingly urge the free ends of the support arms 152 inwardly toward the longitudinal centerline of the machine 10. In this manner, as may be seen from FIGURES 2, 3 and 6 of the drawings, the mid-portions of the reaches of the belts 140 disposed adjacent the cutting disk 94 are biased inwardly substantially to the longitudinal centerline of the machine 10 along which the cutting disk 94 extends.

The cutting disks 142 each has a discharge chute 164 operatively associated therewith stationarily supported from the machine 10 in any convenient manner. In addition, a transverse conveyor belt 166 is disposed adjacent and below the discharge end of the conveyor belt 70 for receiving the split broccoli head halves from the conveyor belt 70.

In operation, broccoli heads which are to be cut are succesively placed on the inlet end of the conveyor belt 70 defined by the roller 46 in inverted position with their stalk or stem portions projecting upwardly. The belt 70 is driven at the same speed as the V-belts 140 and the broccoli heads are thus conveyed toward the horizontal cutting disks 142 and automatically centered on the conveyor belt 70. The cutting disks 142 cut off the base portions of the stalks and the portions of the stalks removed are discharged laterally outwardly of the machine 10 by the discharge chutes 164. The broccoli heads then move into engagement with the vertical cutting disk 94 and the remaining stalk portions and the base ends of the broccoli heads are split by the cutting disk 94 as the broccoli heads pass therebeneath. The split broccoli heads are then discharged off the end of the conveyor belt 70 disposed above the conveyor belt 166 for falling onto the latter and conveyance laterally of the machine 10 to a further processing point at which workers may easily tri-sect the broccoli head halves making broccoli spears which will readily fit into containers in which frozen vegetables are packaged. Inasmuch as the vertical and horizontal knives may be adjusted, the broccoli heads may be cut into various sizes and to compensate for wear as the cutting disks or knves are sharpened. Further, the adjustability of the cuting disks guarantees uniformity of size and insures that a container into which the broccoli spears are to be placed may be filled completely and no one broccoli spear will be too large to fit into a container. As a result, wastage, which is present when broccoli heads are trimmed by even the most expert handler of broccoli, is substantially reduced and the production capacity of the machine 10 is substantially greater than the maximum production of one or more workers trimming the broccoli heads by hand.

From FIGURE 7 of the drawings it may be seen that the broccoli heads first have the base ends of their stalk portions removed by the horizontal cutting disks 142 and then the remaining stalk portions in the base ends of the heads split into by the vertical cutting disk 94. It may also be appreciated that the endless belts 140, after first engaging, centering and gripping the broccoli heads, remain constantly engaged with the broccoli heads while the stalk portions thereof are cut by the horizontal disks 142 and the vertical disk 94 and until the trimmed broccoli heads are ready for discharge from the conveyor belt 70 onto the conveyor belt 166.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A mechanical broccoli cutter including generally first driven conveyor means operative to support inverted broccoli heads thereon and to convey said broccoli heads along a predetermined path disposed in an upstanding plane from a first head receiving position on said path to a second head discharge position spaced along said path from said first position, first knife means supported adjacent said conveyor means at a first point along said path between said first and second positions thereon operative to make a horizontal cut through the upstanding inverted stalk portions of inverted broccoli heads moving along said path, and second knife means supported adjacent said conveyor means at a second point along said path between said first point and said second position operative to make an upstanding cut through the remaining vertically shortened stalk portions of inverted broccoli heads moving along said path, said conveyor means including a first driven support portion movable along said path and disposed in said plane and upon which said inverted broccoli heads are adapted to be supported from beneath and second and third driven portions movable along said path and disposed on opposite sides of said plane and slightly above said first portion, said second and third portions being adapted to embracingly receive the inverted broccoli stalk portions therebetween and being disposed below a horizontal plane containing said first knife means.

2. The combination of claim 1 wherein said first knife means comprises horizontally disposed rotary knife means.

3. The combination of claim 1 wherein said second knife means comprises upright rotary knife means generally centered above said path.

4. The combination of claim 1 wherein said first knife means comprises horizontally disposed rotary knife means including a pair of horizontally disposed rotary knife disks disposed at generally the same elevation above and on opposite sides of said path and including closely adjacent peripheral portions.

5. The combination of claim 1 wherein said second and third portions are supported for shifting transversely of said path and are yieldingly urged toward positions closely spaced apart on opposite sides of said vertical plane so as to lightly clamp said broccoli heads therebetween.

6. The combination of claim 5 wherein said second and third portions each includes vertically spaced reaches of endless flexible belts.

7. The combination of claim 6 wherein the corresponding end portions of said reaches of said belts disposed on opposite sides of said center of said path are at least slightly horizontally divergent.

8. The combination of claim 7 wherein said conveyor means and said reaches are driven at generally the same linear speed along said path.

9. In combination, conveyor means including a lower portion movable along a predetermined path disposed in an upstanding plane between first and second positions in said plane and upon which inverted broccoli heads may be supported from beneath for movement along said path while in said plane, first and second cutting means disposed along said path and operative to sequentially make horizontal and vertical cuts, respectively, through upstanding inverted broccoli head stalks so as to first vertically shorten the stalk by removing the uppermost end thereof and then form a vertical cut in the remaining shortened stalk portion, said conveyor means including means movable along said path and disposed closely adjacent the opposite sides of said plane and operable to continuously lightly clampingly engage stalks of inverted broccoli heads therebetween during movement of the head past the first and second cutting means and to maintain said stalk substantially centered relative to said plane.

References Cited

UNITED STATES PATENTS 3,380,500   4/1968   Alpen _____ 146—78

W. GRAYDON ABERCROMBIE, Primary Examiner

U.S. Cl. X.R.

146—81